US00RE39032E

(19) United States
(12) Reissued Patent
Gonring et al.

(10) Patent Number: US RE39,032 E
(45) Date of Reissued Patent: Mar. 21, 2006

(54) MULTIPURPOSE CONTROL MECHANISM FOR A MARINE VESSEL

(75) Inventors: Steven J. Gonring, Slinger, WI (US); Phillip K. Gaynor, Fond du Lac, WI (US); Kurt D. Willows, West Bend, WI (US)

(73) Assignee: Brunswick Corporation, Lake Forest, IL (US)

(21) Appl. No.: 10/819,079

(22) Filed: Apr. 6, 2004

Related U.S. Patent Documents

Reissue of:
(64) Patent No.: 6,511,354
Issued: Jan. 28, 2003
Appl. No.: 09/873,474
Filed: Jun. 4, 2001

(51) Int. Cl.
*B60K 41/00* (2006.01)

(52) U.S. Cl. ..... 440/87; 74/253
(58) Field of Classification Search ..... 440/87, 440/86; 74/523
See application file for complete search history.

(56) References Cited

U.S. PATENT DOCUMENTS 3,824,879 A * 7/1974 Hansgen et al.
4,056,073 A * 11/1977 Dashew et al.
4,213,353 A * 7/1980 Floeter
4,747,359 A * 5/1988 Ueno
5,062,516 A * 11/1991 Prince
5,090,929 A * 2/1992 Rieben
5,453,030 A * 9/1995 Broussard
5,492,493 A * 2/1996 Ohkita
5,967,867 A * 10/1999 Rinzaki et al.
6,047,609 A * 4/2000 Brower et al.
6,142,841 A * 11/2000 Alexander, Jr. et al.
6,234,853 B1 * 5/2001 Lanyi et al.

* cited by examiner

*Primary Examiner*—Jesus D. Sotelo
(74) *Attorney, Agent, or Firm*—William D. Lanyi; Andrus, Sceales, Starke & Sawall, LLP

(57) ABSTRACT

A multipurpose control mechanism allows the operator of a marine vessel to use the mechanism as both a standard throttle and gear selection device and, alternatively, as a multi-axes joystick command device. The control mechanism comprises a base portion and a lever that is movable relative to the base portion along with a distal member that is attached to the lever for rotation about a central axis of the lever. A primary control signal is provided by the multipurpose control mechanism when the marine vessel is operated in a first mode in which the control signal provides information relating to engine speed and gear selection. The mechanism can also operate in a second or docking mode and provide first, second, and third secondary control signals relating to desired maneuvers of the marine vessel.

36 Claims, 6 Drawing Sheets

MULTIPURPOSE CONTROL MECHANISM FOR A MARINE VESSEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is generally related to a control mechanism for a marine vessel and, more particularly, to a multipurpose control mechanism that allows an operator of a marine vessel to control the throttle and gear shift of the marine vessel in a first mode of operation and, alternatively, in a second mode of operation. The first and second modes of operation can be determined by the speed of the marine vessel, which essentially defines the first and second modes, respectively, as a normal cruising mode and a docking mode. However, the first and second modes can also be defined as one mode to control thrust to both engines (e.g. when used as a dual engine control) when thrust demands to both marine propulsion devices are equal and another mode when differential thrust commands are provided to the two marine propulsion devices.

2. Description of the Prior Art

Many different types of throttle handle control mechanisms are well known to those skilled in the art. In addition, several types of marine vessel maneuvering systems, used during docking procedures, are known to those skilled in the art.

U.S. Pat. No. 4,213,353, which issued to Floeter on Jul. 22, 1980, discloses a control unit for marine engines employing throttle only control. The control unit is of the type that requires shifting control between forward, neutral, and reverse gears and throttle control for engine speeds between idle and high speed. It includes a housing having a control handle rotatably supported by the housing. Shift and throttle linkage means within the housing are connected to the engine and are responsive to rotation of the handle for separate control of the shift and throttle of the engine during respective portions of the arc of rotation of the handle. A throttle only shaft extends from the housing and is connected to the handle. A latch means is connected to the throttle only shaft to engage and disengage the shift linkage while permitting operation of only the throttle function responsive to rotation of the handle.

U.S. Pat. No. 6,047,609, which issued to Brower et al on Apr. 11, 2000, discloses a remote control mechanism. The mechanism is provided with a cam mechanism that allows an operator of a marine vessel or other type of apparatus to move a handle along a generally linear path to simultaneously select the gear selection and throttle selection of the marine vessel. Cam mechanisms within a support structure translate the linear motion of the handle into preselected motions that cause first and second actuators to affect first and second parameters of the propulsion system. Cam followers attached to a control member are moved as in coordination with the handle movement to cause first and second cam tracks to rotate about pivot points relative to the support structure. This rotation of the first and second cam tracks causes first and second actuators to be moved. The actuators, which can be cables, are also connected to selectors of both gear position and throttle position.

U.S. Pat. No. 5,492,493, which issued to Ohkita on Feb. 20, 1996, describes a remote control device for a marine propulsion unit. A remote control operator for a marine propulsion transmission and throttle control that is operated by a single control lever is described. The single control lever's position is sensed and a single servomotor is operated which operates both the transmission control and throttle control through a cam and follower mechanism. A warmup control is also incorporated that permits partial opening of the throttle for warmup operation.

U.S. Pat. No. 5,062,516, which issued to Prince on Nov. 5, 1991, describes a single lever control which, in turn, comprises a housing, a control lever pivotally mounted on the housing and adapted to be operably connected to an engine throttle and to a clutch, a warning horn connected to the housing and adapted to be operably connected to an engine for providing a warning signal when an engine condition exceeds a predetermined value, a cover connected to the housing and adapted to be mounted on a generally flat mounting surface, the cover partially enclosing the housing and enclosing the warning horn, and an ignition switch mounted on the cover and adapted to be operably connected to an engine ignition system.

U.S. Pat. No. 3,824,879, which issued to Hansgen et al on Jul. 23, 1973, describes an actuator for multiple action remote control of a ships drive system. The actuator for speed and directional control of the ships drive and gearing system is described wherein a single handle-lever turns a control shaft with a control disk coupled to a follower disk and when in one axial position only, for the directional control of the gear, while in either axial position the control disk is coupled to the speed control but only after a limited turning range which has been traversed by the handle, which turning range is the one within which the direction control is carried out. The control disk and the follower control disk area coupled for limited range engagement by a single cam pin on the control disk means and a pair of teeth engaging that pin until rotation causes the latter to escape.

U.S. Pat. No. 6,142,841, which issued to Alexander et al on Nov. 7, 2000, discloses a waterjet docking control system for a marine vessel. The control system is provided which utilizes a pressurized liquid at three or more positions of a marine vessel in order to selectively create thrust that moves the marine vessel into desired locations and according to chosen movements. A source of pressurized liquid, such as a pump or a jet pump propulsion system, is connected to a plurality of distribution conduits which, in turn, are connected to a plurality of outlet conduits. The outlet conduits are mounted to the hull of the vessel and direct streams of liquid away from the vessel for purposes of creating thrust which move the vessel as desired. A liquid distribution controller is provided which enables a vessel operator to use a joy stick to selectively compress and dilate the distribution conduits to orchestrate the streams of water in a manner which will maneuver the marine vessel as desired. Electrical embodiments of the present invention can utilize one or more pairs of impellers to cause fluid to flow through outlet conduits in order to provide thrust on the marine vessel. In one embodiment of the present invention, a cross thrust conduit is associated with a marine vessel to direct fluid flow in a direction perpendicular to a centerline of the marine vessel and a pair of outlet conduits are associated with the marine vessel to direct flows of fluids in directions which are neither parallel nor perpendicular to a centerline of the marine vessel. In this embodiment, reversible motors are used to rotate associated impellers in either forward or reverse directions. In any of the embodiments of the invention, a joy stick control can be used to select to deselect each of the outlet conduits and, in certain embodiments, to select the direction of operation of an associated reversible motor.

U.S. Pat. No. 5,090,929, which issued to Rieben on Feb. 25, 1992, describes a paired motor system for small boat propulsion and steerage.

Paired spaced electrically driven motors provide a steerable propelling system for small boats. Each motor drives a propeller carried in an elongate channel, communicating from each lateral side of a boat beneath the water line to one boat end, to move water through such channels for boat propulsion. The electrical motors are of variable speed, reversible, and separately controlled by a joystick type control device to provide differential control of motor speed to allow steerage.

The propelling system provides a low speed, maneuverable propulsion system for fishing use, as an auxiliary power system for boats having a separate principal powering system, and to aid maneuverability alone or in conjunction with the principal powering system.

U.S. Pat. No. 4,747,359, which issued to Ueno on May 31, 1988, describes an apparatus for controlling the turn of a ship. When the right turn or left turn is set by operating one joystick lever, the bow thruster arranged on the bow side generates the drift thrust in the rightward or leftward direction in accordance with the turning angular velocity on the basis of the operation of the joystick lever. At the same, propellers provided on the stern side are controlled so as to generate the backward thrust proportional to the absolute value of the turning angular velocity of the ship. The forward thrust of the ship which is caused due to the generation of the drift thrust by the bow thruster is suppressed. Thus, the ship is turned to the right or left around the stern as a rotational center at a predetermined speed with the position of the hull held.

U.S. Pat. No. 4,056,073, which issued to Dashew et al on Nov. 1, 1977, describes a boat thruster which includes a diverter valve and an inlet connected to a water pump, a pair of outlets extending to either side of the boat, a valve mechanism for accurately controlling the amount of thrust obtained from both outlets, and a deflector positioned at each outlet. Each deflector is movable between a first position wherein it allows sideward water discharge to thrust the bow to the side, and a second position wherein it directs water rearwardly to move the boat in a forward direction, or if required, to a third position to move the boat rearwardly.

U.S. Pat. No. 6,234,853 which issued to Lanyi et al on May 22, 2001, discloses a simplified docking method and apparatus for a multiple engine marine vessel. The docking system is provided which utilizes the marine propulsion unit of a marine vessel, under the control of an engine control unit that receives command signals from a joystick or push button device, to respond to a maneuver command from the marine operation. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone.

The patents and patent application described above are hereby expressly incorporated by reference in the description of the present invention.

The prior art illustrates many different types of throttle control mechanisms which allow an operator to manually move a lever in order to control the operation of a marine propulsion system. The prior art also shows many different types of marine vessel maneuvering, or docking, systems which allow a marine vessel operator to maneuver the marine vessel at relatively slow speeds in order to perform docking procedures. Typically, the maneuvering or docking of a marine vessel utilizes a joystick or other type of control mechanism that is separate and independent from the control mechanism that the marine vessel uses during normal operation of the marine vessel at higher engine speeds.

It would therefore be significantly beneficial if a control mechanism could be devised which allows a marine vessel operator to use a single control mechanism to control the marine vessel during both high speed and low speed operation. In other words, it would be beneficial if a control mechanism could allow the marine vessel operator to use the same mechanism for both controlling the speed and gear selection of the marine vessel at relatively high speeds and, also, control the individual maneuvering devices of the marine vessel during low speed docking procedures.

SUMMARY OF THE INVENTION

A multipurpose control mechanism for a marine vessel made in accordance with the present invention comprises a base portion and a lever that is movably attached to the base portion. Movement of the lever along a first path relative to the base portion provides a primary control signal for a primary marine propulsion function of the marine vessel when the multipurpose control mechanism is in a first mode. In the description of the present invention, the first mode can represent the operation of the marine vessel at relatively high engine speeds which are above a preselected threshold speed or, as in dual engine applications, the first mode can represent a situation when both marine propulsion devices are provided with identical thrust demands from the operator of the marine vessel. Conversely, a second mode of operation of the marine vessel, in the description of the present invention, is used to describe a mode during which the engine of the marine vessel is operated at a relatively low speed which is less than a preselected threshold speed and, in most cases, when the marine vessel operation is maneuvering the marine vessel for docking purposes. In certain dual engine applications, the second mode can represent a mode in which a differential thrust command can be provided to either one or both of the marine propulsion devices to alter the relative thrusts of those devices.

A distal member is attached to the lever for rotation about a central axis of the lever. Rotation of the distal member about the central axis provides a secondary control signal for a secondary marine propulsion function of the marine vessel when the multipurpose control mechanism is in the second mode. Movement of the lever along the first path relative to the base portion provides a second secondary control signal for the secondary marine propulsion function of the marine vessel when the multipurpose control mechanism is in the second mode. Movement of the lever along a second path relative to the base portion provides a third secondary control signal for the secondary marine propulsion function of the marine vessel when the multipurpose control mechanism is in the second mode.

In a preferred embodiment of the present invention, the lever is rotatably movable relative to the base portion about a generally horizontal axis. The first path is aligned in a forward-aft direction and the second path is aligned in a port-starboard direction. The secondary marine propulsion function comprises operation of a marine propulsion engine at speeds less than a preselected threshold, whereas the primary marine propulsion function comprises operation of the marine propulsion engine at speeds greater than the preselected threshold. In a typical application of the present invention, the secondary marine propulsion function of the marine vessel is a docking function. The distal member can control the relative speeds of two outboard motors to accomplish docking maneuvers or, alternatively, it can control the relative thrust provided by two or more thrusters attached to the marine vessel for these same docking purposes. In addition, the device of the present invention allows the operator of a marine vessel to select differential changes to the relative thrusts provided by dual engine propulsion devices.

BRIEF DESCRIPTION OF THE DRAWINGS

The present invention will be more fully and clearly understood from a reading of the description of the preferred embodiment of the present invention, in conjunction with the drawings, in which.

DESCRIPTION OF THE PREFERRED EMBODIMENT

Figure 1:
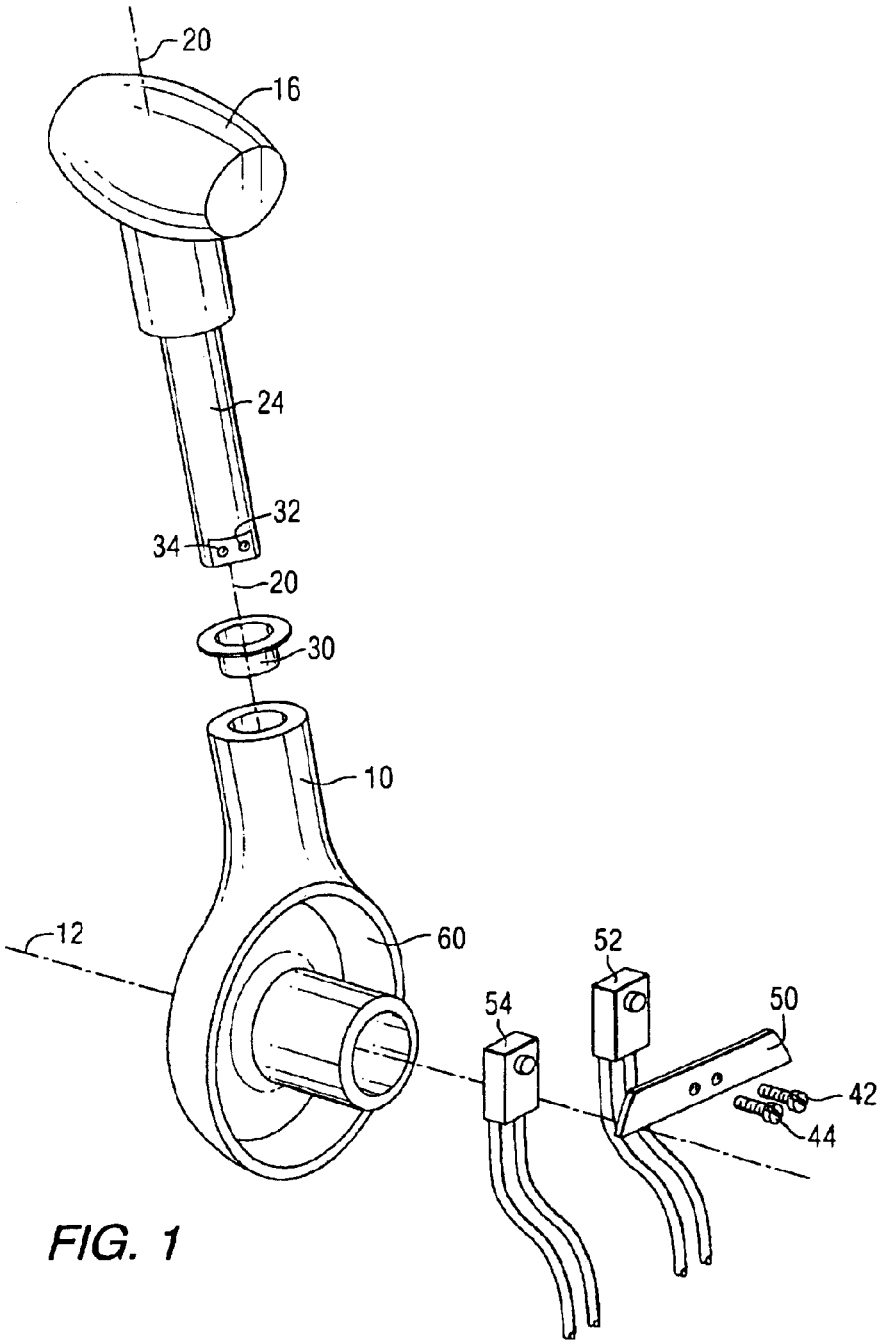
FIG. 1 is an exploded isometric view of the present invention.

Throughout the description of the preferred embodiment of the present invention, like components will be identified by like reference numerals.

FIG. 1 is an exploded isometric view of a portion of the multipurpose control mechanism of the present invention. A lever 10 is attached to a base portion, which will be described below in conjunction with FIG. 2 for rotation about a generally horizontal axis 12. A distal member 16, or hand grip portion, is attached to the lever 10 for rotation about a central axis 20 of the lever 10. A shaft 24, which is attached to the distal member 16, is inserted into the lever 10 and through a bushing 30. At the bottom of the shaft 24, two tapped holes, 32 and 34, are shaped to receive two screws, 42 and 44, respectively. This allows an actuator bar 50 to be attached to the end of the shaft 24 and rotate about axis 20 with the distal member 16. Two switches, 52 and 54, are mounted within the cavity 60 of the lever 10 and positioned to be actuated by the ends of the actuator bar 50 when it moves in response to rotation of the distal member 16 about axis 20. The two switches, 52 and 54, provide signals to an engine control unit (ECU) which represent the rotation of the distal member 16 and shaft 24 about axis 20 in response to manipulation of the distal member 16 by the operator of a marine vessel. As will be described in greater detail below in conjunction with FIGS. 4, 5, and 6, rotation of the distal member 16 about the central axis 20 of the lever 10 allows the operator of the marine vessel to provide control signals to an engine control unit (ECU) which are used during docking procedures. The switches, 52 and 54, can be momentary push button switches with a spring return feature.

Figure 2:
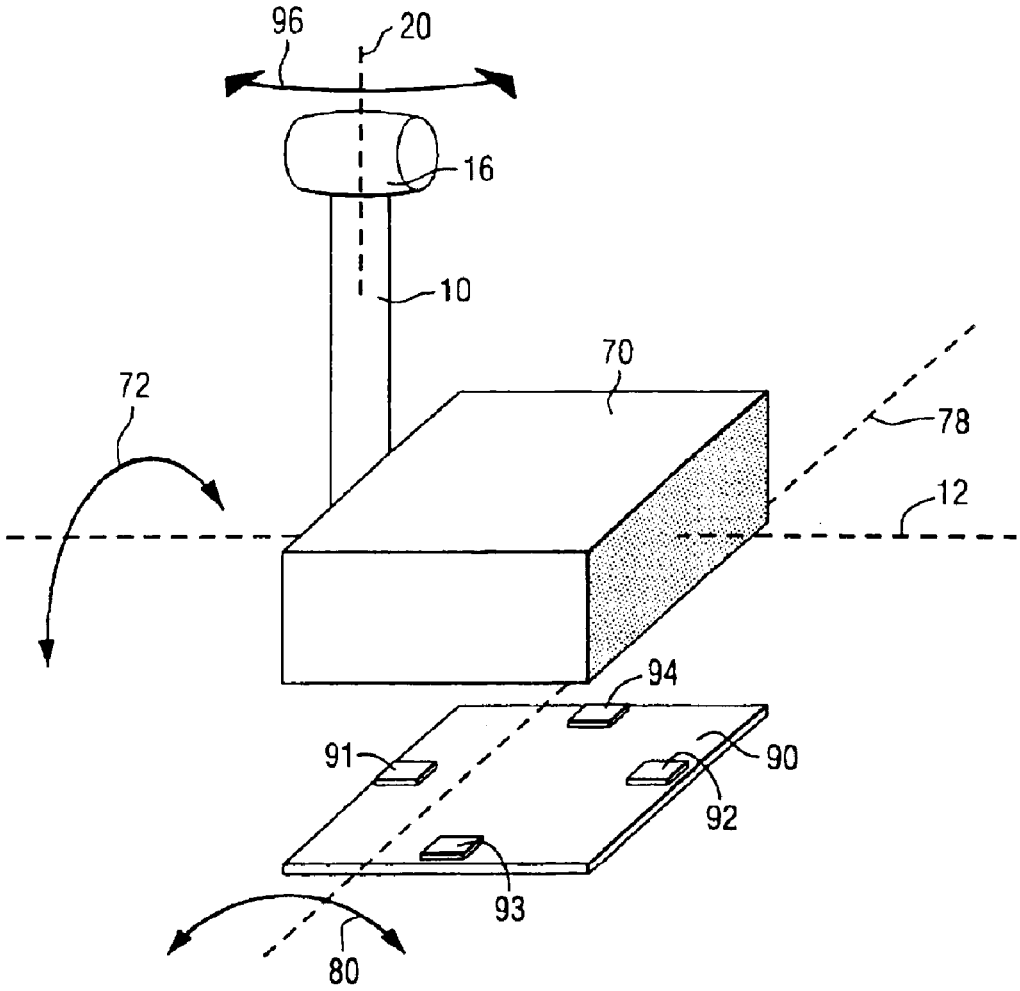
FIG. 2 is an highly simplified and schematic representation of the present invention.

FIG. 2 is a highly simplified and schematic isometric representation of a multipurpose control mechanism for a marine vessel made in accordance with the present invention. A base portion 70 is attachable to a convenient portion of a marine vessel near an operator station at the helm. The lever 10 is movably attached to the base portion 70 and, in a particularly preferred embodiment of the present invention, is rotatably attached to the base portion 70 for rotation about a generally horizontal axis 12, as represented by arrow 72. When the lever is moved along a first path, represented by arrows 72, it provides a primary control signal for a primary marine propulsion function of the marine function when the multipurpose control mechanism is in a first mode (e.g. operating at high speed). The primary control signal typically includes a forward or reverse speed control signal and a forward, neutral, or reverse gear selection signal. This use of a lever of a throttle mechanism is known to those skilled in the art.

The distal member 16 is attached to the lever 10 for rotation about a central axis 20 of the lever 10. Rotation of the distal member 16 about the central axis 20 provides a secondary control signal for a secondary marine propulsion function of the marine vessel when the multipurpose control mechanism is in a second mode. Typically, the distal member provides the secondary control signal when the operator is maneuvering the marine vessel for purposes of docking. This operation will be described in greater detail below in conjunction with FIG. 5. In a typical application of the present invention, the first mode of operation exists when the engine is operating at an engine speed greater than a preselected threshold, such as an idle speed magnitude. The second mode typically exists when the engine is operating at an engine speed less than the preselected engine speed threshold. A manually operated switch can also be used to allow the operator to select the second mode if the engine speed is less than the threshold magnitude. In other words, the control mechanism is in the second mode at low docking speeds and in the first mode at high speeds. When a marine operator is piloting a marine vessel at relative high engine speeds, movement of the lever 10 about axis 12, as represented by arrows 72, allows the marine vessel to determine the speed of the boat. When in the second mode, movement of any feature of the multipurpose control mechanism allows the marine vessel operator to precisely maneuver the marine vessel for docking purposes. When in the second mode, movement of the lever 10 along the first path 72 relative to the base portion, provides a second secondary control signal for the secondary marine propulsion function of the marine vessel when the multipurpose control mechanism is in the docking or maneuvering mode.

Certain embodiments of the present invention also allow movement of the lever 10 along a second path about axis 78, as represented by arrow 80. It should be understood that the physical movement along the second path 80 in a preferred embodiment of the present invention can be very slight. This movement provides a third secondary control signal used for docking purposes when the control mechanism is in the second mode. A platform 90 is provided with sensors 91–94, that detect movement of the base portion 70 relative to the platform 90. The sensors 91–94 can be force sensors or any other suitable type of sensor or switch that detects a force by the lever 10 on the base 70 that creates a resulting movement, however slight, along the third secondary control signal path 80. It should be understood that two sensors, 91 and 92, can be used in certain embodiments without the need of the other two sensors, 93 and 94. However, alternative embodiments of the present invention may elect physically to lock the lever 10 in position relative to the base 70 under certain conditions and sense the movement of the base 70 relative to the platform 90 when the multipurpose control mechanism is in the second mode and the marine vessel operator is docking the vessel with maneuvering commands.

Figure 3:
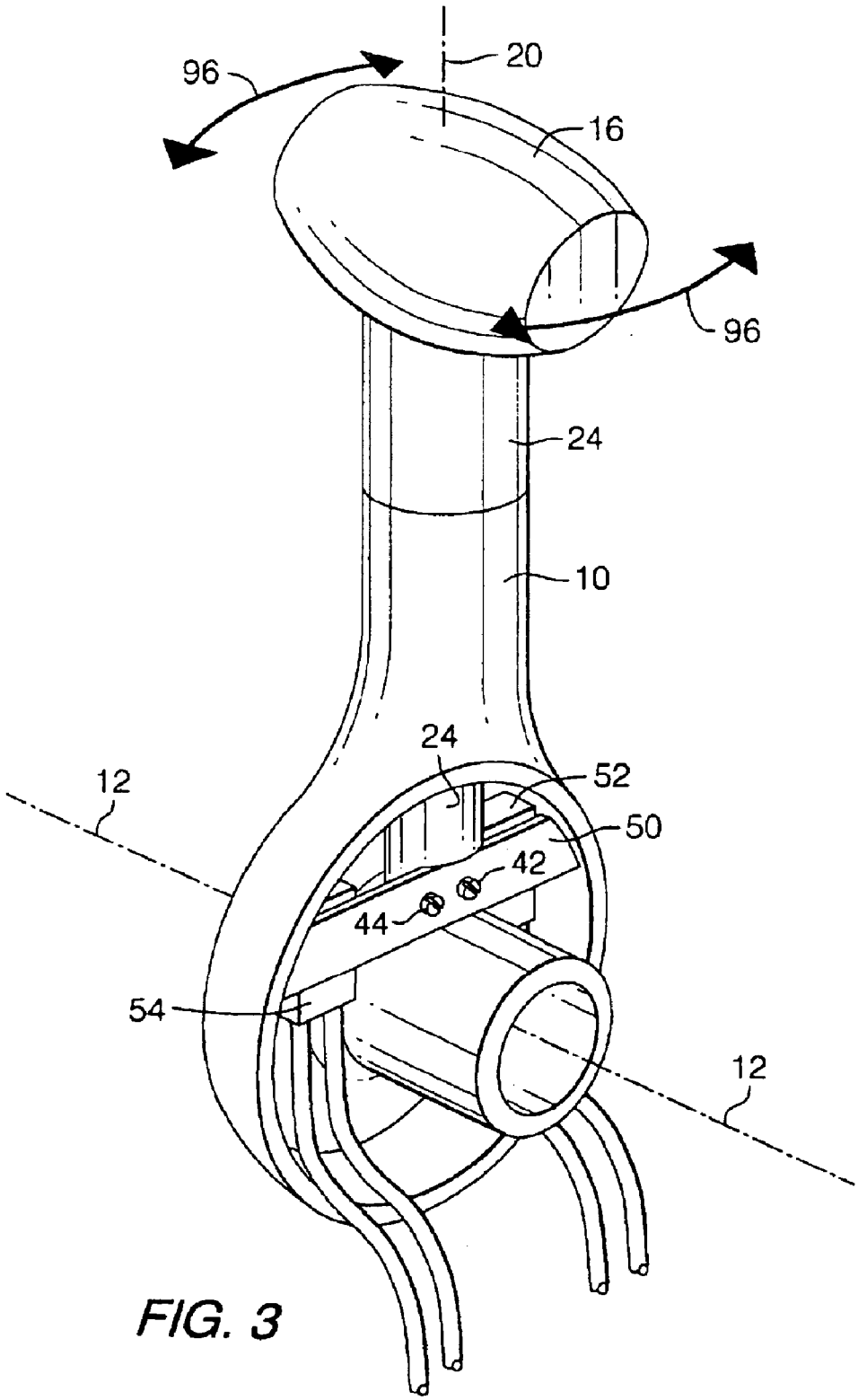
FIG. 3 is an assembled view of the device shown in FIG. 1.

FIG. 3 shows an assembled view of the mechanism described above in conjunction with FIG. 1. The actuator bar 50 is attached to the end of shaft 24 and placed in a position that actuates switches 52 and 54 in response to movement of the distal member 16 and shaft 24 about axis 20, as represented by arrows 96. The lever 10 is attachable to a base, such as base 70 described above in conjunction with FIG. 2 for rotation about axis 12.

As described above, many different types of docking and maneuvering systems are known to those skilled in the art for use in docking a marine vessel. These systems typically provide a joystick or control pad for an operator or manipulate during the maneuvering procedures. Some docking systems, such as the one described above in U.S. Pat. No. 6,142,841, provide a separate docking propulsion system in addition to a primary propulsion system that is used when operating the vessel at high speeds. Other maneuvering and docking systems utilize the same propulsion components for both maneuvering at low speeds and propelling the marine vessel at higher speeds. A system of this combined type is described in U.S. patent application Ser. No. 09/502,816 which is described above. The present invention operates in a traditional manner when the marine vessel is operated at speeds above a threshold engine speed (e.g. idle speed) in order to perform the functions typically performed by a joystick when the marine vessel is operated at lower speeds and when the marine vessel operator is maneuvering the marine vessel for purposes of docking. In other words, the present invention performs dual functions so that a separate joystick controller is not needed in addition to the standard throttle mechanism controller that is typically provided on all marine vessels.

Figure 4:
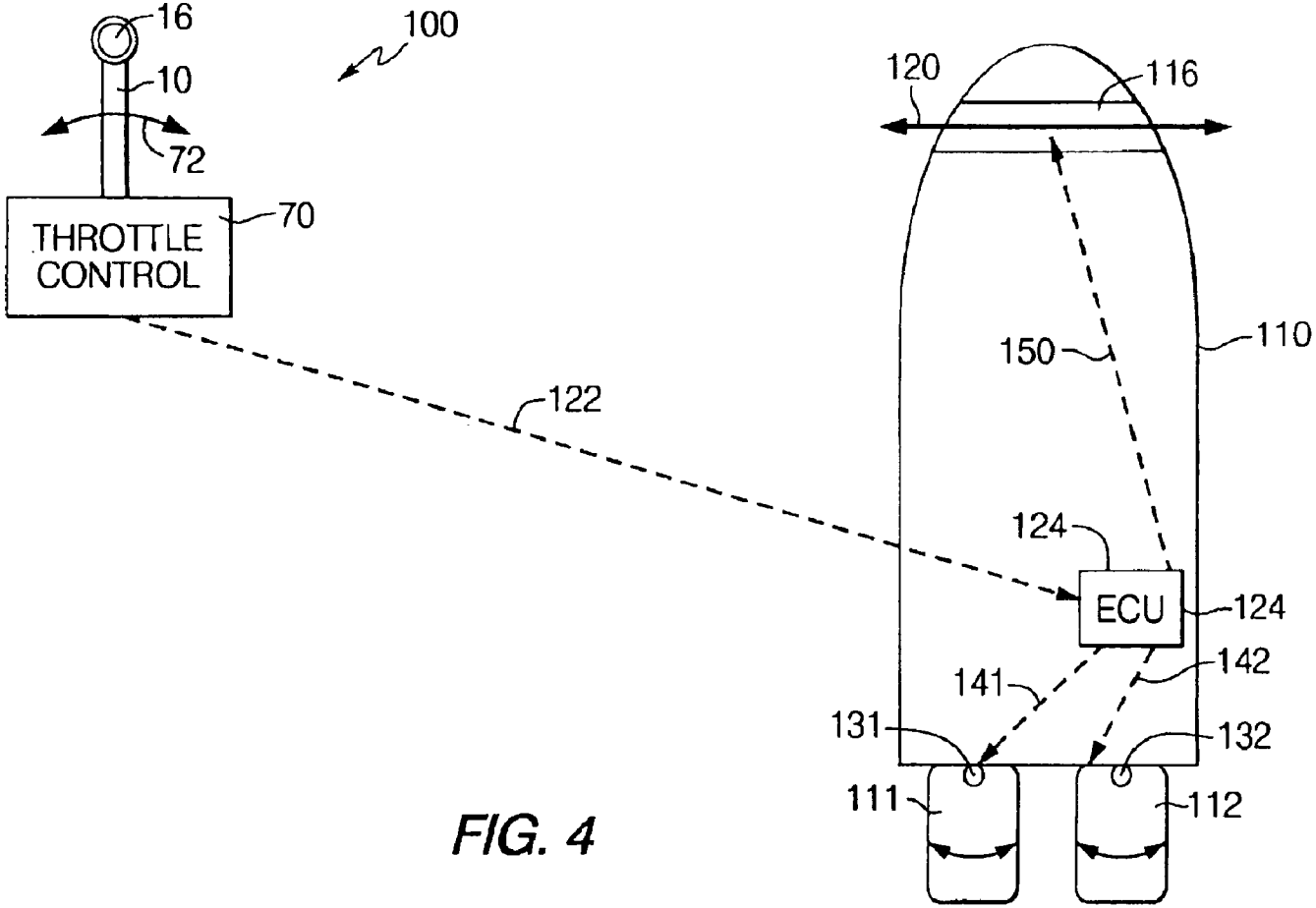
FIG. 4 shows the present invention utilized in conjunction with one type of docking system.

FIG. 4 is a simplified representation of the multipurpose control mechanism 100 of the present invention as described above, used in conjunction with a marine vessel 110 that comprises two outboard motors, 111 and 112. In the marine vessel 110 shown in FIG. 4, the propulsion system is also provided with a bow thruster 116 which provides a force represented by arrow 120 to assist the maneuvering of the marine vessel 110. It should be understood that bow thrusters 116 are not required in conjunction with all embodiments of the present invention.

Control signals are provided by the multipurpose control mechanism 100, on line 122, to an engine control unit (ECU) 124. The engine control unit, in turn, provides signals to the two outboard motors, 111 and 112, which control the thrusts provided by each of the outboard motors and the rotational position of each of the outboard motors about their respective steering axes, 131 and 132. This type of control is described in detail in U.S. patent application Ser. No. 09/502,816 which was filed on Feb. 11, 2000. The engine control unit 124 can provide individual signals, on lines 141 and 142, to the two outboard motors, 111 and 112.

These signals would control the rotational position of each outboard motor and the thrust provided by each of the two outboard motors. The engine control unit can also provide a signal 150 to the bow thruster 116.

During normal operation of the marine vessel 110, at relatively high engine speeds, the multipurpose control mechanism 100 only provides gear selection signals and engine speed or thrust signals on line 122 to the engine control unit 124. These signals are only provided in response to rotation of the lever 10 about axis 12 as described above in conjunction with FIGS. 1–3. Rotation of the distal member 16 about axis 20 does not provide a signal that is received and accepted by the engine control unit 124 unless the engine speed is below the preselected threshold. Similarly, signals received by the engine control unit 124 from the sensor 91–94 are ignored if the engine speed is above the preselected threshold.

This is done for purposes of safety since high speed operation of the marine vessel 124 is not amendable to the sudden maneuvers that would otherwise occur if the signals relating to the movement of the distal member 16 along path 96 or movement of the base portion 70 relative to axis 78 along path 80 were followed when the engine speed was operating at greater than the threshold engine speed. Some embodiments may also require the operator to manually select the second mode by actuating a switch.

Figure 5:
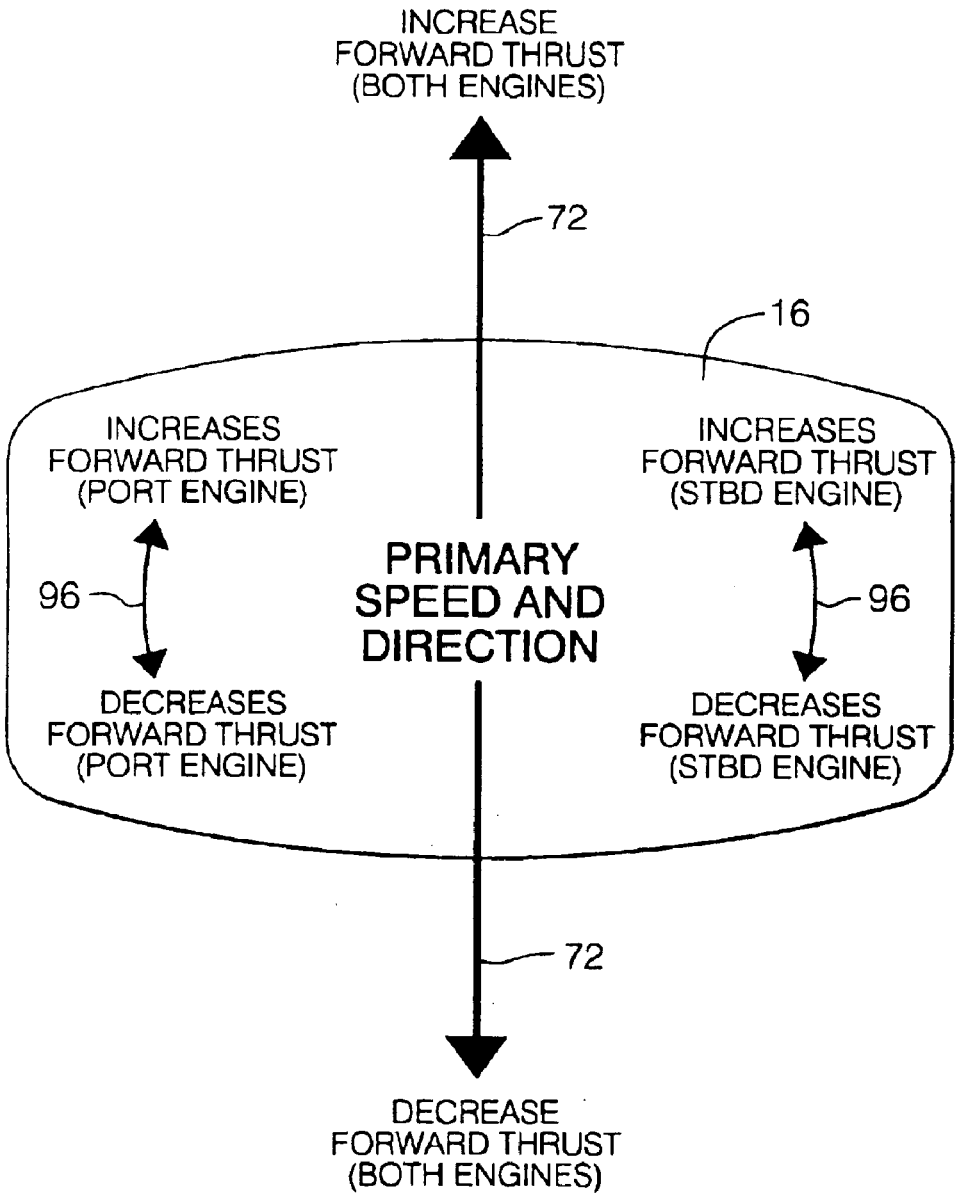
FIG. 5 shows a distal member of the present invention.

FIG. 5 is a top view looking down on the distal member 16. For purposes of reference, path 72 is represented by an arrow in FIG. 5 which is associated with movement of the lever 10 about axis 12. Forward movement of the lever 10 and the distal member 16 increases forward thrust on both outboard motors, 111 and 112 and reverse movement of lever 10 decreases the forward thrust of both engines. It should be understood that certain embodiments of the present invention, as described above, can be used in conjunction with outboard motors 111 and 112 which can provide not only forward and reverse thrust but, in certain embodiments, can be associated with controllable pitch propellers for these purposes. If the distal member 16 is rotated in a clockwise direction about axis 20, forward thrust on the port engine 11 is increased an forward thrust on the starboard engine 112 is decreased. If the distal member 16 in rotated in a counterclockwise direction about axis 20, forward thrust on the starboard engine 112 is increased while forward thrust on the port engine 111 is decreased. When used in conjunction with a system such as that described and claimed in U.S. patent application Ser. No. 09/502,816, described above, the manipulation of the distal member 16 about its rotational axis 20 allows the marine vessel operator to maneuver the marine vessel 110 for purposes of docking. Additionally, signals provided by the sensors 91–94 and provided as a result of movement of the lever 10 about axis 12 along path 72 can be interpreted by the engine control unit 124 in combination with each other, to result in complex maneuvers of the marine vessel 110 as described above in conjunction with maneuvering and docking systems known to those skilled in the art.

Figure 6:
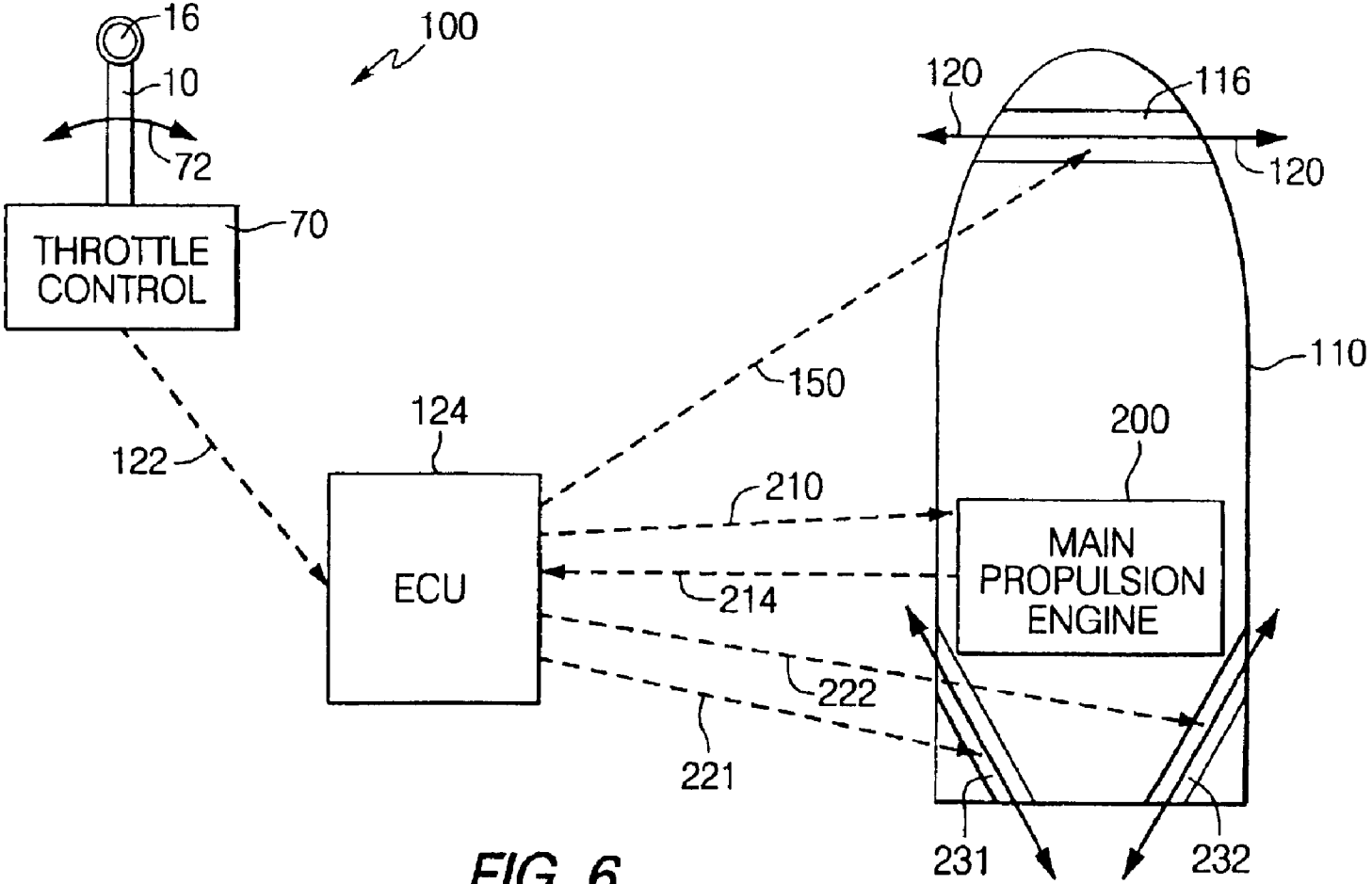
FIG. 6 shows the present invention used in conjunction with a second type of marine docking system.

FIG. 6 shows an alternative embodiment of the present invention used in conjunction with a docking system such as that described in U.S. Pat. No. 6,142,841. The engine control unit 124 receives signals from the multipurpose control mechanism 100 of the present invention and determines appropriate signals to the various primary and secondary propulsion systems. For example, if the marine vessel 110 is operating in a first mode with the main propulsion engine 200 operating at an engine speed greater than a preselected threshold, the engine control unit 124 would provide signals to the engine 200 on line 210 relating to engine speed. Although the propeller system (e.g. outboard motor, sterndrive, or inboard system) is not illustrated in FIG. 6, it should be understood that the engine control unit 124 would also provide signals relating to the gear selection of the marine propulsion system. The engine control unit 124 also receives signals from the engine 200, on line 214, relating to engine speed and other related variables. The engine speed is monitored by the engine control unit 124 to determine whether or not it is safe to place the multipurpose control mechanism 100 in the second mode which allows the engine control unit 124 to receive and respond to signals caused by movement of the distal member 16 about its axis 20 and movement of the lever 10 about axis 78, as described above in conjunction with FIG. 2. Furthermore, it allows the engine control unit 124 to determine whether or not signals caused by movement of the lever 10 about axis 12 should be interpreted as control signals relating to mode 1 or mode 2. If the system is in mode 2 and the marine vessel operator is docking the marine vessel 110, the engine control unit 124 can also provide control signals, on lines 221 and 222, to the two rear thrusters, 231 and 232, for maneuvering the marine vessel 110 according to the system described in detail in U.S. Pat. No. 6,142,841.

It can be seen that the present invention provides a multipurpose control mechanism that serves both as a normal throttle lever and, also, as multi-axis joystick control system. When in a first mode under normal usage, the lever 10 allows the operator to control the engine speed and gear selection in a manner that is well known to those skilled in the art and currently provided on most marine vessels. When in a second mode, or docking mode, the multipurpose control mechanism of the present invention allows the operator to use the device as a joystick and provide signals to an engine control unit 124 by moving the mechanism about axes 12 and 78 and by also moving the distal member 16 about axis 20. As a result, the multipurpose control mechanism allows the operator to use the device as a joystick without the requirement of providing a separate joystick mechanism. The engine control unit monitors engine speed and disables the joystick commands when the marine vessel is operated at engine speeds greater than a preselected threshold. It should be understood that the present invention has been described as having first or second modes which are dependent on the engine speed but, in a broader sense, it should be understood that the first and second modes could alternatively be selected as a function of boat speed relative to the water in which the boat is operated. In some embodiments, a manual switch can be required to place the system in the second mode if the speed is appropriate. Also, it should be understood that certain embodiments of the present invention could lock the position of the lever 10 relative to the base 70 when in maneuvering mode and use the sensors 91–94 to determine the intent of the marine vessel operator relative to movement of the lever 10 about axes 12 or 78.

It should be clearly understood that the present invention can be applied in at least two different ways. One way, as described above, allows the marine vessel operator to operate the vessel in a first, or planing, mode and in a second, or docking, mode. The other way that the present invention can be operated is where the operator uses the device in a first mode to control two propulsion devices identically and a second mode which treats them individually.

In the first mode, both propulsion devices are given simultaneous and identical thrust commands as the operator moves the lever 10 about axis 12. Movement of the lever either increases or decreases the thrust commands to the engines, but those commands are identical for both engines. In the second mode, the marine vessel operator rotates the distal member 16 about axis 20 to provide a differential command that changes the relative thrusts provided by the two propulsion devices.

The engine control unit 124 receives momentary signals from either of the switches, 52 and 54, which represent a request by the operator to change the relative thrust commands to the two propulsion devices. Potentiometers may also be used for this purpose. Although many algorithms can be applied to accomplish this, the engine control unit can increment the thrust command for the associated engine for every increment of time that the switch 52 or 54, is activated. A differential value can then be stored which represents a difference between the two engines' thrusts for all future movements of the lever 10 about axis 12 until the operator again elects to use the distal member 16 to change this relative offset in thrusts between the two propulsion devices.

As an example, if the vessel operator detects that the port engine is providing slightly greater thrust than the starboard engine, causing a tendency of the vessel to drift toward starboard, the operator can rotate the distal member 16 about axis 20 to activate switch 52 momentarily. As long as switch 52 is activated, the engine control unit increments a differential thrust variable of the starboard engine, decreases a differential thrust variable of the port engine, or both. The net result is that the relative thrust of the starboard engine, relative to the port engine, is increased. Future movements of the lever 10 about axis 12 will increase or decrease both engine thrusts equally, while maintaining the differential offset requested by the operator.

The operation of the present invention can involve secondary propulsion devices (e.g. bow thrusters, and supplemental docking thrusters) when operating in the second mode or, alternatively, the operation of the present invention can affect only the primary marine propulsion devices (e.g. outboard motors) when in the second mode. Under both methods of operation, a primary marine propulsion function (e.g. high speed operation, simultaneous thrust commands to both engines) is performed while in the first mode and a secondary marine propulsion function (e.g. docking, differential thrust commands to the engines) is performed while in the second mode.

Although the present invention has been described in particular detail and illustrated to show several embodiments, it should be understood that alternative embodiments are also within its scope.

We claim:

1. A multipurpose control mechanism for a marine vessel, comprising:

a base portion;

a lever movably attached to said base portion, movement of said lever along a first path relative to said base portion providing a primary control signal for a primary marine propulsion function of said marine vessel when said multipurpose control mechanism is in a first mode; and a distal member attached to said lever for rotation about a central axis of said lever, rotation of said distal member about said central axis providing a secondary control signal for a secondary marine propulsion function of said marine vessel when said multipurpose control mechanism is in a second mode.

2. The multipurpose control mechanism of claim 1, wherein:

movement of said lever along said first path relative to said base portion provides a second secondary control signal for said secondary marine propulsion function of said marine vessel when said multipurpose control mechanism is in said second mode.

3. The multipurpose control mechanism of claim 1, wherein:

movement of said lever along a second path relative to said base portion provides a third secondary control signal for said secondary marine propulsion function of said marine vessel when said multipurpose control mechanism is in said second mode.

4. The multipurpose control mechanism of claim 1, wherein:

said lever is rotatably movable relative to said base portion about a generally horizontal axis.

5. The multipurpose control mechanism of claim 1, wherein:

said first path is aligned in a forward-aft direction.

6. The multipurpose control mechanism of claim 3, wherein:

said second path is aligned in a port-starboard direction.

7. The multipurpose control mechanism of claim 1, wherein:

said primary marine propulsion function comprises operation of a marine propulsion engine at speeds greater than a preselected threshold.

8. The multipurpose control mechanism of claim 7, wherein:

said secondary marine propulsion function comprises operation of said marine propulsion engine at speeds less than said preselected threshold.

9. The multipurpose control mechanism of claim 1, wherein:

said secondary marine propulsion function of said marine vessel is a docking function.

10. The multipurpose control mechanism of claim 1, wherein:

said distal member controls the relative speeds of two outboard motors.

11. A multipurpose control mechanism for a marine vessel, comprising:

a base portion;

a lever movably attached to said base portion, movement of said lever along a first path relative to said base portion providing a primary control signal for a primary marine propulsion function of said marine vessel when said multipurpose control mechanism is in a first mode, said lever being rotatably movable relative to said base portion about a generally horizontal axis; and a distal member attached to said lever for rotation about a central axis of said lever, rotation of said distal member about said central axis providing a secondary control signal for a secondary marine propulsion function of said marine vessel when said multipurpose control mechanism is in a second mode.

12. The multipurpose control mechanism of claim 11, wherein:

movement of said lever along said first path relative to said base portion provides a second secondary control signal for said secondary marine propulsion function of said marine vessel when said multipurpose control mechanism is in said second mode.

13. The multipurpose control mechanism of claim 12, wherein:

movement of said lever along a second path relative to said base portion provides a third secondary control signal for said secondary marine propulsion function of said marine vessel when said multipurpose control mechanism is in said second mode.

14. The multipurpose control mechanism of claim 13, wherein:

said first path is aligned in a forward-aft direction.

15. The multipurpose control mechanism of claim 14, wherein:

said second path is aligned in a port-starboard direction.

16. The multipurpose control mechanism of claim 15, wherein:

said primary marine propulsion function comprises operation of a marine propulsion engine at speeds greater than a preselected threshold.

17. The multipurpose control mechanism of claim 16, wherein:

said secondary marine propulsion function comprises operation of said marine propulsion engine at speeds less than said preselected threshold.

18. The multipurpose control mechanism of claim 17, wherein:

said distal member controls the relative speeds of two outboard motors.

19. A multipurpose control mechanism for a marine vessel, comprising:

a base portion;

a lever movably attached to said base portion, movement of said lever along a first path relative to said base portion providing a primary control signal for a primary marine propulsion function of said marine vessel when said multipurpose control mechanism is in a first mode; and a distal member attached to said lever for rotation about a central axis of said lever, rotation of said distal member about said central axis providing a secondary control signal for a secondary marine propulsion function of said marine vessel when said multipurpose control mechanism is in a second mode, said secondary control signal for a secondary marine propulsion function of said marine vessel being disabled when an associated engine of said marine vessel is operating at speeds above a predetermined threshold magnitude.

20. The multipurpose control mechanism of claim 19, wherein:

movement of said lever along said first path relative to said base portion provides a second secondary control signal for said secondary marine propulsion function of said marine vessel when said multipurpose control mechanism is in said second mode, movement of said lever along a second path relative to said base portion providing a third secondary control signal for said secondary marine propulsion function of said marine vessel when said multipurpose control mechanism is in said second mode, said lever being rotatably movable relative to said base portion about a generally horizontal axis, said first path being aligned in a forward-aft direction, said second path is aligned in a port-starboard direction, said primary marine propulsion function comprising operation of a marine propulsion engine at speeds greater than a preselected threshold, said secondary marine propulsion function comprising operation of said marine propulsion engine at speeds less than said preselected threshold.

*21. A multipurpose control mechanism for a marine vessel, comprising:*

*a base portion;*

*a lever movably attached to said base portion, movement of said lever along a first path relative to said base portion providing a primary control signal for a primary marine propulsion function of said marine vessel when said multipurpose control mechanism is in a first mode; and*

*a distal member attached to said lever for movement of at least one of said distal member and said lever along a second path relative to said base portion providing a secondary control signal for a secondary marine propulsion function of said marine vessel when said multipurpose control mechanism is in a second mode.*

*22. The multipurpose control mechanism of claim 21 wherein said first path is aligned in a forward-aft direction.*

*23. The multipurpose control mechanism of claim 21 wherein said second path is aligned in a port-starboard direction.*

*24. The multipurpose control mechanism of claim 23 wherein said second path is an arc about a horizontal axis.*

*25. The multipurpose control mechanism of claim 24 wherein said horizontal axis extends in a forward-aft direction.*

*26. The multipurpose control mechanism of claim 21 wherein in combination:*

*said first path is aligned in a forward-aft direction and is an arc about a first horizontal axis which extends in a port-starboard direction;*

*said second path is aligned in a port-starboard direction and is an arc about a second horizontal axis which extends in a forward-aft direction;*

*said primary marine propulsion function comprises operation of a marine propulsion engine at speeds greater than a preselected threshold;*

*said secondary marine propulsion function comprises operation of said marine propulsion engine at speeds less than said preselected threshold, and wherein said secondary marine propulsion function of said marine vessel is a docking function.*

*27. The multipurpose control mechanism of claim 21 wherein said secondary control signal for said secondary marine propulsion function of said marine vessel is disabled when an associated engine of said marine vessel is operating at speeds above a predetermined threshold magnitude, and wherein movement of said lever along said first path relative to said base portion provides a second secondary control signal for said secondary marine propulsion function of said marine vessel when said multipurpose control mechanism is in said second mode, said primary marine propulsion function comprising operation of a marine propulsion engine at speeds greater than a preselected threshold, said secondary marine propulsion function comprising operation of said marine propulsion engine at speeds less than said preselected threshold.*

*28. The multipurpose control mechanism of claim 27 wherein said distal member is a separate member distinct from said lever.*

*29. The multipurpose control mechanism of claim 28 wherein said distal member is movable relative to said lever.*

*30. A multipurpose control mechanism for a marine vessel, comprising a base portion, a lever moveably attached to said base portion, movement of said lever along a first path relative to said base portion providing a primary control signal for a primary marine propulsion function of said marine vessel when said multipurpose control mechanism is in a first mode, movement of said lever along a second path relative to said base portion providing a secondary control signal for a secondary marine propulsion function of said marine vessel when said multipurpose control mechanism is in a second mode.*

*31. The multipurpose control mechanism of claim 30 wherein said first path is aligned a forward-aft direction.*

*32. The multipurpose control mechanism of claim 30 wherein said second path is aligned in a port-starboard direction.*

*33. The multipurpose control mechanism of claim 32 wherein said second path is an arc about a horizontal axis.*

*34. The multipurpose control mechanism of claim 33 wherein said horizontal axis extends in a forward-aft direction.*

*35. The multipurpose control mechanism of claim 30 wherein in combination:*

*said first path is aligned in a forward-aft direction and is an arc about a first horizontal axis which extends in a port-starboard direction;*

*said second path is aligned in a port-starboard direction and is an arc about a second horizontal axis which extends in a forward-aft direction;*

*said primary marine propulsion function comprises operation of a marine propulsion engine at speeds greater than a preselected threshold;*

*said secondary marine propulsion function comprises operation of said marine propulsion engine at speeds less than said preselected threshold, and wherein said secondary marine propulsion function of said marine vessel is a docking function.*

*36. The multipurpose control mechanism of claim 30 wherein said secondary control signal for said secondary marine propulsion function of said marine vessel is disabled when an associated engine of said marine vessel is operating at speeds above a predetermined threshold magnitude, and wherein movement of said lever along said first path relative to said base portion provides a second secondary control signal for said secondary marine propulsion function of said marine vessel when said multipurpose control mechanism is in said second mode, said primary marine propulsion function comprising operation of a marine propulsion engine at speeds greater than a preselected threshold, said secondary marine propulsion function comprising operation of said marine propulsion engine at speeds less than said preselected threshold.*

* * * * *